April 3, 1951     A. A. FARHAT     2,547,633
ROTARY SHAFT SEAL
Filed Aug. 27, 1947
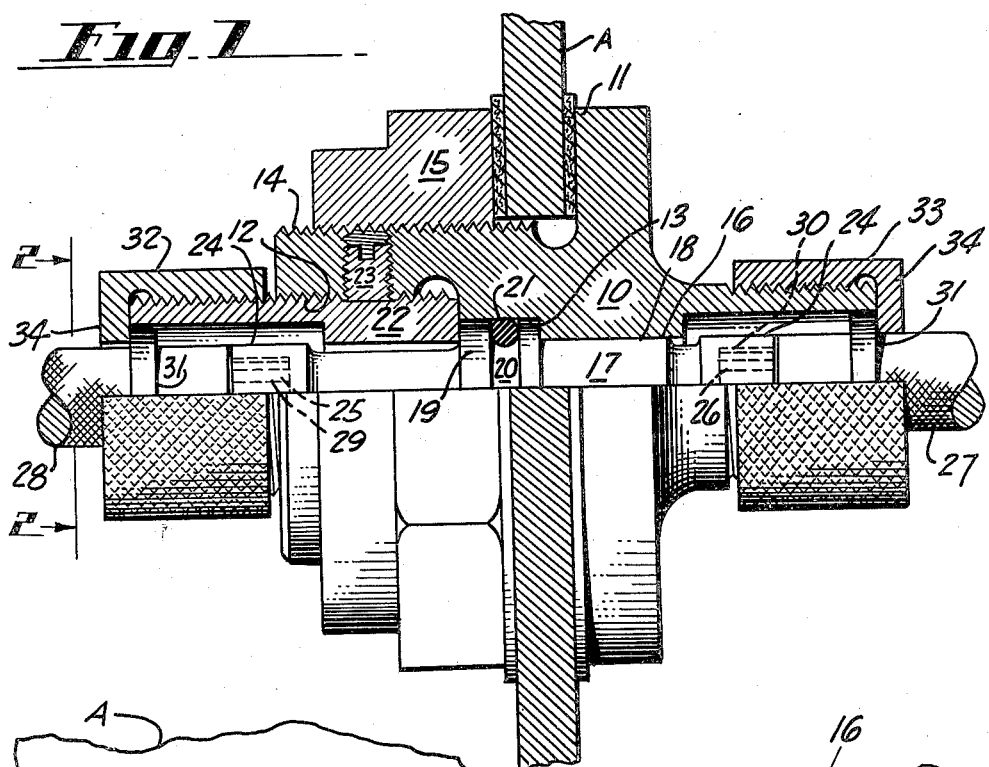
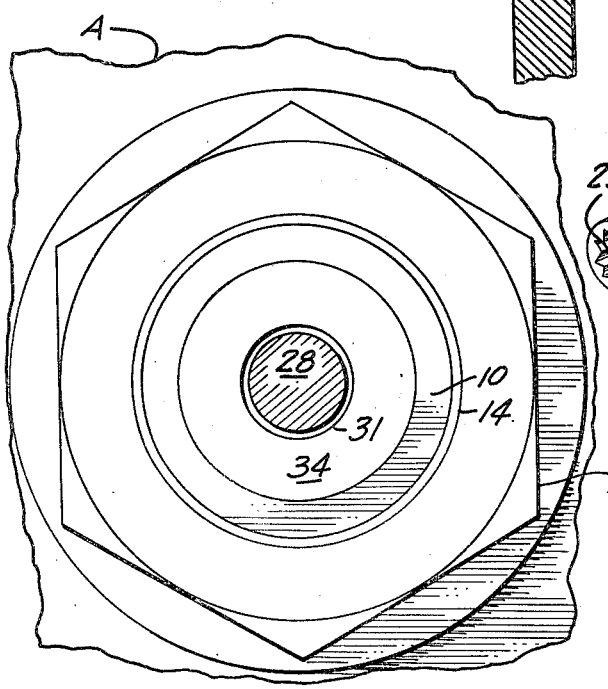
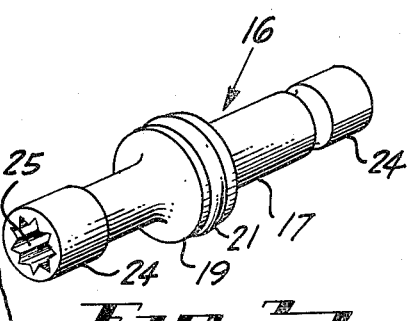
INVENTOR.
ANNIS A. FARHAT
BY Edwin Coates
ATTORNEY

UNITED STATES PATENT OFFICE 2,547,633

ROTARY SHAFT SEAL

Annis A. Farhat, West Los Angeles, Calif., assignor to Douglas Aircraft Company, Inc., Santa Monica, Calif.

Application August 27, 1947, Serial No. 770,788

5 Claims. (Cl. 308—36.1)

This invention relates to pressure seals, and especially to those for hermetically sealing an elongate object, such as shafting, tubing or the like, passing through an opening in a partition which is subjected to differential air pressure on its opposite faces.

Modern transport aircraft fly at relatively great altitudes, and hence the air in their passenger compartments requires pressurization. Tubing, shafting and other elongate objects passing from these compartments to unpressurized compartments, or compartments at lower air pressure, through bulkheads and other partitions must, therefore, be sealed to the bulkhead in such a manner as to prevent loss of air pressure through the bulkhead around the elongate object where it passes through the aperture, even though it may contact the periphery of the aperture in an apparently airtight manner.

The seal of the present invention is adapted to hermetically close the passage of substantially any type of elongate object through virtually any type of opening in a pressure bulkhead, sealing not only the elongate object but concurrently and equally hermetically sealing the space between the object and the periphery of the opening.

The elongate object passing through the aperture may comprise an integral length of shafting or tubing passing undivided through the bulkhead, or may, in certain embodiments of the invention, comprise the centrally disposed coupling-section of a longitudinally sectionalized system of tubing or shafting, such as a tachometer shaft, or tachometer-type of shafting employed in connection with other instruments, such as in controlling radar, radio and other equipment.

In either case, however, the present seal essentially comprises an elongate, hollow supporting member or body, annularly flanged near the one end thereof, the flange carrying on its inner face an annular gasket surrounding the aperture, the opposite end of the body passing through the aperture and projecting from the other face of said partition. The projecting portion is threaded on its exterior periphery and its interior periphery bears two concentric bores, the inner bore being of lesser diameter than the outer bore. The inner wall of the outer bore is threaded while the wall of the inner bore is smoothly cylindrical. The supporting member is held in place in the aperture, and the gasketed flange thereof held hermetically against the adjacent face of the partition around the aperture, by means of a flanged, gasketed collar or nut reaching on the exterior threads of the aforesaid projecting portion of the supporting member and hermetically bearing against the adjacent face of the partition.

The shafting, tubing or other elongate member passing through the hollow supporting member is sealed to the inner one of the aforesaid concentric bores by means of an annular collar thereon which is seated in said bore and bears sealing means on its periphery of the type that acts to longitudinally and radially conform the flange hermetically to the adjacent wall of the bore while permitting the flanged-shafting free rotation about its longitudinal axis. An externally threaded sleeve, or other stop, reaches on the internal threads of the outer one of the concentric bores and bears securely at its inner end against the outer radial surface of the flange on the shafting or tubing.

For sealing the passage through pressure bulkheads of shafting which may be susceptible to more rapid deterioration than the aforementioned shafting, the seal of the invention is constructed to enable the deteriorated length to be removed from the seal without affecting the basic configuration thereof and without impairing the air-tight integrity of the center of the aperture, and in fact, of that of the entire aperture in the partition. To this end, the shafting is divided into two sections, the one section terminating in a splined formation adjacent the projecting end of the body, and the other shafting section terminates in a splined formation adjacent the opposite end of said body portion. A shafting coupling and sealing member in the form of an elongate rod formed with an annular collar medially of its length and bearing at each end a hollow, internally splined collar, is passed through the partition aperture substantially at right angles to the partition, the medially disposed collar being seated and sealed in the innermost bore in the body member as in the previous embodiment. The splined terminals of the shafting sections are engaged with the splines of the aforesaid collars. On the inner end of each shafting section, adjacent the splined formation, are provided abutment means, such as a flange, and a collar, having an inturned annular flange on its inner ends, is removably mounted on each of the opposite ends of the longitudinally extending, central portion of the seal. Each such collar concentrically surrounds the splined unions of each shafting section with the coupling section and each inturned flange bears securely against each abutment means to positively prevent uncoupling of the shafting sections. Thus, in order to remove the deteriorated shafting section, it is only necessary to back off the flanged collar holding it in splined union with the coupling section, whereupon the deteriorated section may be easily withdrawn and replaced by a new section.

For purposes of exemplification and clarification, the last mentioned embodiment of the invention is illustrated in the accompanying drawings and described hereinafter in detail, but it is to be understood that the invention is limited only by the scope of the annexed claims, as to the embodiments which it can take.

In these drawings:

Figure 1 is a view, partly in elevation and partly in longitudinal section, showing the last mentioned embodiment in use with tachometer-type shafting sections;

Figure 2 is a side view, partly in section on line 2—2 of Figure 1; and

Figure 3 is a perspective view showing the shaft-coupling section removed from the supporting member.

The illustrated construction includes a body or supporting member 10 having the general form of a hollow cylinder including a gasketed annular flange 11 disposed adjacent the one end thereof. The opposite end of the body, which projects through the aperture in the partition is provided with two concentric, coaxial bores 12 and 13, the inner bore 13 being of lesser diameter than the outer bore 12. The projecting portion of the member 10 has its exterior periphery threaded, as at 14, to receive a flanged, gasketed nut 15 which reaches on these threads to abut hermetically against the partition.

The body 10 is adapted to rotatably support a sealing and coupling member 16 in the illustrated embodiment of the invention. The member 16 is formed with a relatively large cylindrical bearing 17 rotatably supported by a complementary bearing surface 18 formed concentric with the bore 13 on the inner wall of the supported member 10. The coupling member 16 is also provided with an enlarged collar 19 lying near the medial portion of the member 16 and just adjacent the relatively large bearing 17. The collar seats in the inner bore 13 and the outer bore or circumferential face of the collar is machined concentric with the bearing 17.

The relatively large bearing surfaces 17 and 18 hold the section 16 and the collar 19 to rotational movement about an axis coincident with the axis of the bore 13. This is important, for in the present invention the circumferential face of the collar 19 forms the primary sealing surface of the device. To this end the face of the collar 19 is formed with an annular groove 20 in which is seated an O-ring 21. The diameter of the collar 19 is slightly less than the diameter of the bore 13 and the O-ring 21 serves as a packing ring and seals the bore of the body member.

The inner radial surface of the collar 19 bears against the adjacent radial face of the inner bore 13, and is held in such contact by means of a sleeve 22 threadedly reached on the threaded inner surface of the bore 12. To prevent the sleeve from backing out of the bore 12 a set screw 23 is passed radially through the adjacent end of body 10 and into engagement with the sleeve.

The flange 11 and its gasket are adapted to be clamped hermetically against the adjacent wall of the partition, after the opposite end of the body member has been passed through the aperture, by setting up sufficiently tightly on the gasketed nut 15, which concurrently thereby hermetically seals its contact with the adjacent face of the partition. By these means, the rim or peripheral portions of the aperture is sealed in an airtight manner.

The central, and the other remaining areas of the aperture, are equally hermetically sealed by instrumentalities including the conforming action of the O-ring against the wall of the bore 13, which it engages longitudinally and laterally in an airtight manner, since the diameter of the collar 19 is slightly less than the diameter of the bore 13 receiving same. The airtight engagement between the relatively long bearing surfaces 17 and 18; the equally complete contact between the inner radial face of the collar 19 and the adjacent radial wall at the inner end of the bore 13; and the engagement of the inner end face of the sleeve 22 with the adjacent radial face of the collar 19, augment the sealing of the shaft and of the central region of the aperture in the bulkhead.

In order to enable one of the shaft sections to rotatingly drive the other while providing for easy and rapid replacement of a deteriorated or damaged section, a spline type coupling construction is provided at each end of the central, shaft-coupling member 16. For this purpose, the opposite ends of the shaft coupling member 16 are enlarged and hollowed to constitute sockets 24, the inner surfaces of which are serrated or splined, as at 25 and 26. Each of the shaft sections 27 and 28, the motion of one which is to be transmitted to the other through the partition without air leakage, is provided with external serrations or splines 29 and 30 on the end thereof which is adjacent to the sockets, and these formations are adapted to interlockingly engage with the similar, but circumferentially displaced, formations in the sockets on the shaft coupling member 16. To hold the shaft sections 27 and 28 securely in engagement with the coupling member 16, each section 27 and 28 is provided with an annular flange 31 and internally threaded bands 32 and 33, each having an inturned flange 34. When these bands are threadedly mounted on the sleeve 22 and body member 10 respectively the inturned flanges 34 draw the sections inwardly together by their action on the flanges 31, which are larger in diameter than the internal diameter of the flanged opening in the bands 32 and 33.

Instead of employing a sleeve 22 abutting the collar 19 on the central coupling member 16 in order to hold this member in place, it may, if desired, be held in place by means of a simple bushing pressed in at one end of the device; and instead of being internally splined, the ends of the coupling member 16 may be exteriorly splined and overlapped by internally splined collars on the ends of the shafting sections to be connected. In this case, the shafting sections 27 and 28 may be centered, if desired, by means of removable bearings, or the like.

Various equivalent parts may be substituted for the specific ones disclosed hereinabove for purposes of exemplification; in fact, the invention contemplates any modification of the illustrative embodiment that lies within the scope of the annexed claims.

I claim:

1. In a seal for hermetically closing the passage of sectional shafting through a supporting member mounted airtightly in an aperture in a partition exposed to differential air pressures on opposite faces thereof, a combined shaft coupling section and aperture-center sealing member, comprising: an elongate, generally cylindrical rod disposed intermediate the shafting sections and passing through said aperture and including a substantially centrally located annular flange adapted to rotate loosely and coaxially of the supporting member and bearing a peripherally extending sealing member conforming longitudinally and radially to the adjacent wall of the supporting member; an enlargement of said rod disposed longitudinally adjacent to, and concentric with, said flange and adapted to tightly contact the wall of said supporting member peripherally so as to maintain said flange centered in said supporting member and to retain the peripheral sealing member on said flange in equal contact with all portions of the wall of said seat, whereby to obviate uneven wear on said sealing member and maintain said coupling shaft centered and running true.

2. In a seal for hermetically closing the passage of sectional shafting through a supporting member mounted airtightly in an aperture in a partition exposed to differential air pressures on opposite faces thereof, a combined shaft coupling section and aperture-center sealing member, comprising: an elongate, generally cylindrical rod disposed intermediate the shafting sections and passing through said aperture and including a substantially centrally located annular flange adapted to rotate loosely and coaxially of the supporting member and bearing a peripherally extending sealing member conforming longitudinally and radially to the adjacent wall of the supporting member; an enlargement of said rod disposed longitudinally adjacent to, and concentric with, said flange and adapted to tightly contact the wall of said supporting member peripherally so as to maintain said flange centered in said supporting member and to retain the peripheral sealing member on said flange in equal contact with all portions of the wall of said seat, whereby to obviate uneven wear on said sealing member and maintain said coupling shaft centered and running true and positive-engagement formations on the interior of each end of said coupling shaft adapted to releasably engage corresponding formations on the adjacent ends of the shafting sections to be coupled, whereby to effect transmission of forces from one shafting section to the other shafting section while precluding the passage of air from one side of said partition to the other side thereof through said aperture.

3. A unit for hermetically sealing the central region of an aperture in a pressurized partition through which an elongate object passes, comprising: a member extending through the aperture and including two concentric bores in the one end thereof; an annular shoulder on said elongate object circumferentially carrying thereon a sealing member and seated in the inner one of said bores and bearing by its inner face against the inner end of said bore; threads on the inner face of the outer bore; and a correspondingly threaded sleeve engaged in said bore and reached against the other face of said annular shoulder on said elongate object to hold said object longitudinally immobile in the first said bore against end thrusts originating in said elongate object and to complete the sealing of said central region.

4. A unit for hermetically sealing the central region of an aperture in a pressurized bulkhead through which an elongate object passes, comprising: a supporting member extending through the aperture and hermetically fixed to said bulkhead and including concentric bores in the one end thereof, the inner bore defining an annular shoulder at its inner end; an annular flange on said elongate member seated in the inner one of said bores and bearing on one face against the inner end of said bore; a peripheral groove on said flange; a radially and longitudinally elastically, deformable sealing member seated in said groove and bearing hermetically, yet rotatably, against the main wall of said bore; threads on the inner face of the outer bore; and a correspondingly threaded sleeve engaged in said bore and reached against the opposite face of said flange to hold same longitudinally immobile in the first said bore and to complete the sealing of said central region.

5. In a differentially pressurized partition, a sealing construction for passing fluidtight and rotatably through an aperture therein, a shaft extending through a hollow elongate supporting member traversing said aperture and bearing a fixed abutment near the one end, the opposite end portion bearing a movable abutment reachable thereon to urge both abutments together to fix said supporting member to said partition and including a plurality of concentric bores in said opposite end, the internal wall of the outermost bore being threaded, comprising: members interposed radially between the inner faces of said abutments and said partition and conformable hermetically thereto; an annular flange on said shaft seated in the innermost one of said concentric bores and hermetically sealed to its seat bore radially and longitudinally; an externally threaded sleeve reached in said outermost bore against the outer radial face of the shaft flange sufficiently to lock said shaft against longitudinal displacement and to complete the sealing of the central region of the aperture; and locking means extending radially through said other end of said supporting member and into sufficient engagement with said sleeve to prevent rotation thereof.

ANNIS A. FARHAT.

REFERENCES CITED

The following references are of record in the file of this patent:

UNITED STATES PATENTS

| Number | Name | Date |
| --- | --- | --- |
| 669,540 | Miller | Mar. 12, 1901 |
| 1,367,800 | Carroll | Feb. 8, 1921 |
| 1,557,569 | Eames et al. | Oct. 20, 1925 |
| 1,689,912 | Carrey | Oct. 30, 1928 |
| 2,161,767 | Russell | June 6, 1939 |
| 2,314,598 | Phelan | Mar. 23, 1943 |
| 2,394,364 | Christensen | Feb. 5, 1946 |

FOREIGN PATENTS

| Number | Country | Date |
| --- | --- | --- |
| 31,511 | France | Mar. 16, 1927 |